Figure 4:
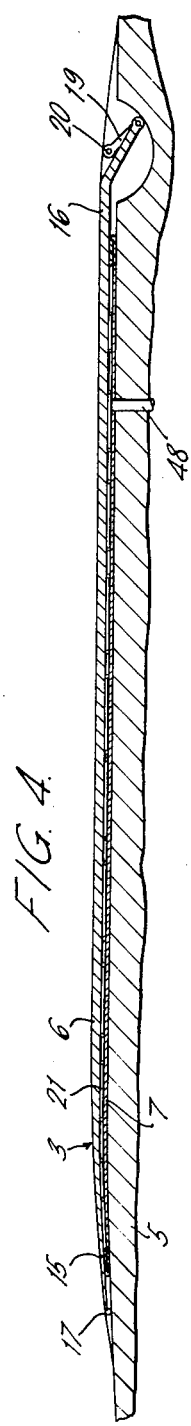

United States Patent [19]

Rhodes

[11] 4,026,503
[45] May 31, 1977

[54] FUEL STORAGE MEANS

[75] Inventor: Arthur Neville Rhodes, Warton Aerodrome, near Preston, England

[73] Assignee: British Aircraft Corporation Limited, London, England

[22] Filed: Dec. 18, 1975

[21] Appl. No.: 641,886

[30] Foreign Application Priority Data

Dec. 19, 1974 United Kingdom ............. 55073/74

[52] U.S. Cl. ........................... 244/135 B; 220/1 B; 220/85 B; 244/201; 244/107
[51] Int. Cl.² ......................................... B64D 37/06
[58] Field of Search ........... 244/135 R, 135 B, 105, 244/107, 44; 220/85 B, 1 B, 18; 114/16 R, 16 E

[56] References Cited

UNITED STATES PATENTS

| 2,010,549 | 8/1935 | Maring | 244/44 |
|---|---|---|---|
| 2,258,490 | 10/1941 | Gutridge | 244/44 |
| 2,432,025 | 12/1947 | Lorenz | 220/85 B |
| 2,777,656 | 1/1957 | Clifton | 244/135 B |
| 3,409,253 | 11/1968 | Berg et al. | 244/135 R |
| 3,447,768 | 6/1969 | McQueen | 244/135 R |
| 3,812,804 | 5/1974 | Nagata et al. | 114/16 R |

FOREIGN PATENTS OR APPLICATIONS 279,904 11/1930 Italy ..................................... 244/44

Primary Examiner—Trygve M. Blix
Assistant Examiner—Galen L. Barefoot
Attorney, Agent, or Firm—Cushman, Darby & Cushman

[57] ABSTRACT

An expandable fuel storage tank for aircraft has a resilient exterior wall panel in the form of a leaf spring anchored at both ends to a surface region of the aircraft, one anchorage being in the form of a simple hinge and the other incorporating a translatory device so that when the wall panel becomes bowed outwards due to the fuel storage tank being filled with fuel the ends of the panel can move relatively toward one another. The panel is formed as a spring such that when fuel is removed from the fuel storage tank, the panel tends to flatten to resume a position in general continuity with the surface region of the aircraft.

10 Claims, 14 Drawing Figures

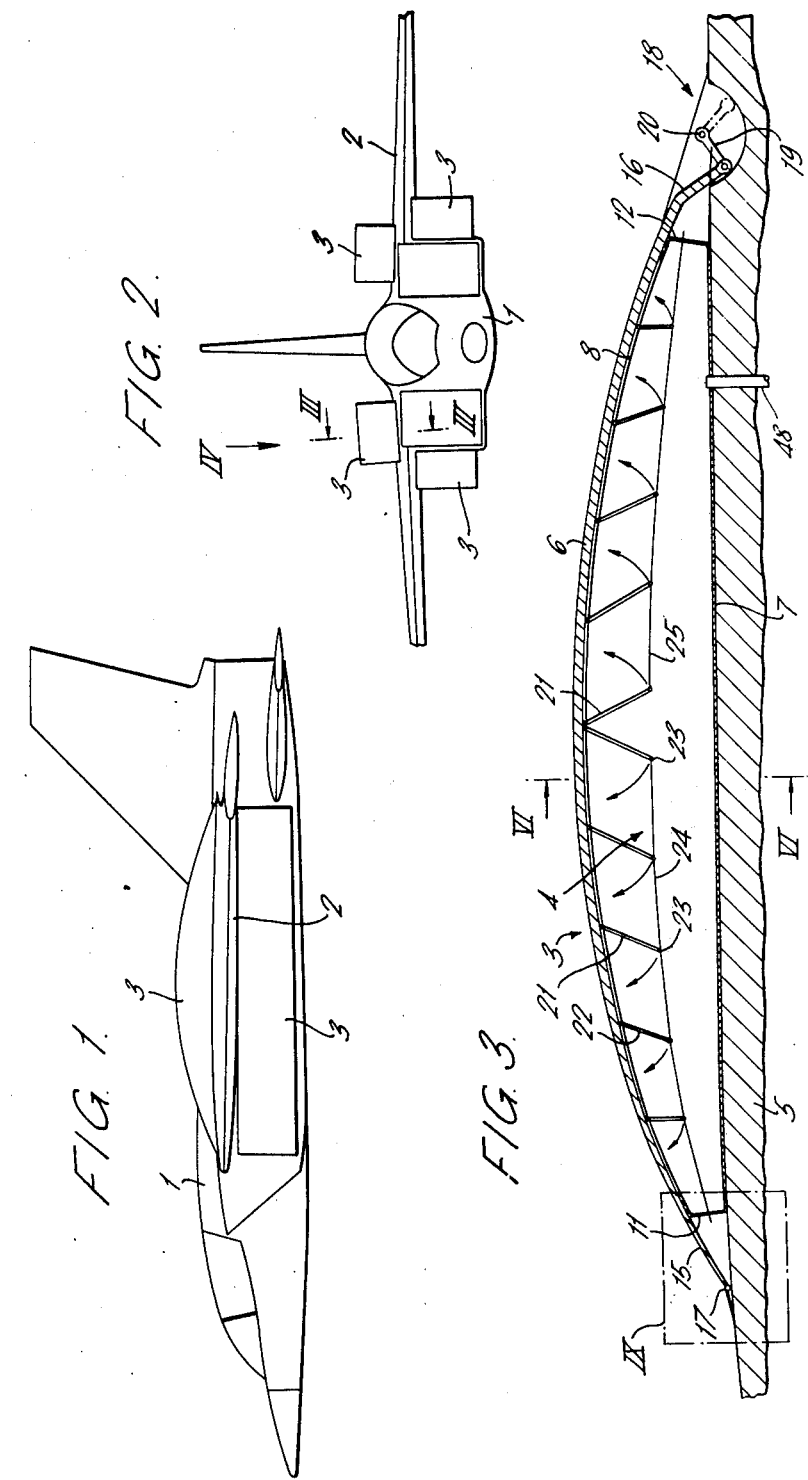

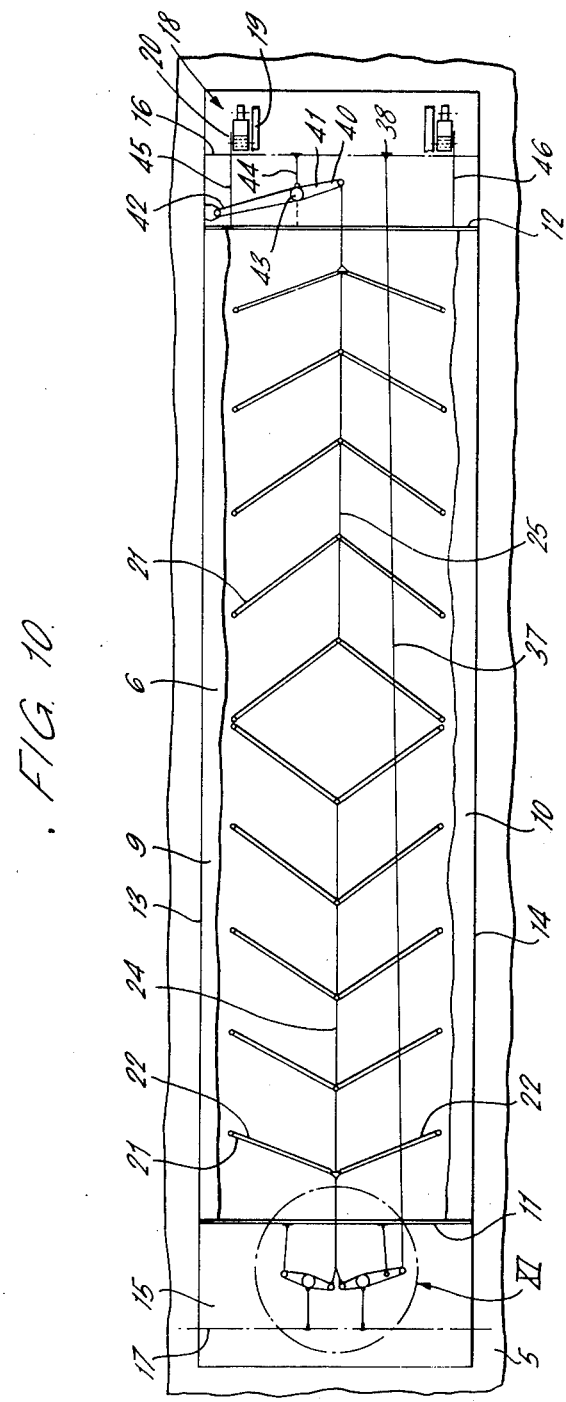

FUEL STORAGE MEANS

Expandable fuel storage means are described in U.S. Pat. Nos. 3,409,253 and 3,447,768. In the former an expandable fuel tank is slung from a pylon on an aircraft wing; it is expandable from a pencil-like shape suitable for high speed flight to a cigar-like shape in order to carry more fuel. The tank expands radially and is limited to mounting on an aircraft stores pylon.

The present invention is concerned with expandable tanks which do not require to use an aircraft pylon, which can then be used to carry other aircraft stores such as electronic countermeasures or reconnaissance packs, guided weapons or bombs.

In the latter specification an aircraft wing is illustrated with a flexible sheet extending over its upper surface, the region between the flexible sheet and the upper surface being fillable with fuel to provide auxiliary tankage. The flexible sheet is held in position by a series of straps. As the auxiliary tank is emptied the straps and the flexible sheet are drawn into a cavity within the wing. The flexible sheet has little rigidity of its own and the arrangement disclosed is not entirely suitable for relatively high speed flight with its high aerodynamic loadings.

Accordingly the present invention is further concerned with the provision of an expandable fuel containing means which with withstand relatively high aerodynamic loadings both when expanded and when collapsed and which presents relatively low drag in both conditions.

According to the present invention an aircraft has a surface region, a fuel storage means expandable to a position in which it is at least partially external to the surface region, the fuel storage means including a deformable exterior wall panel having two opposite end regions with an intermediate region between, anchorage means for anchoring the two opposite end regions of said panel to spaced regions of the aircraft surface region, translatory means included in at least that anchorage means at one of said end regions to allow that end region to move toward said other end region when the intermediate region between said end regions of the wall panel is bowed outwards from a position close to the surface region to lie proud of said surface region.

Preferably the deformable exterior wall panel is biased toward that position in which its intermediate region lies adjacent or continuous with the surface region. In this case the wall panel is conveniently formed such that it is inherently biased toward that position.

Some preferred embodiments of the invention are now described with reference to the accompanying drawings. In these drawings:

FIG. 1 is a side view of a high winged aircraft with fuel storage means according to the invention in an expanded condition, FIG. 2 is a front view of the aircraft of FIG. 1, FIG. 3 is an enlarged cross-sectional view of a fuel storage means in an expanded condition, the section being taken on line III—III of FIG. 2.

Figure 5:
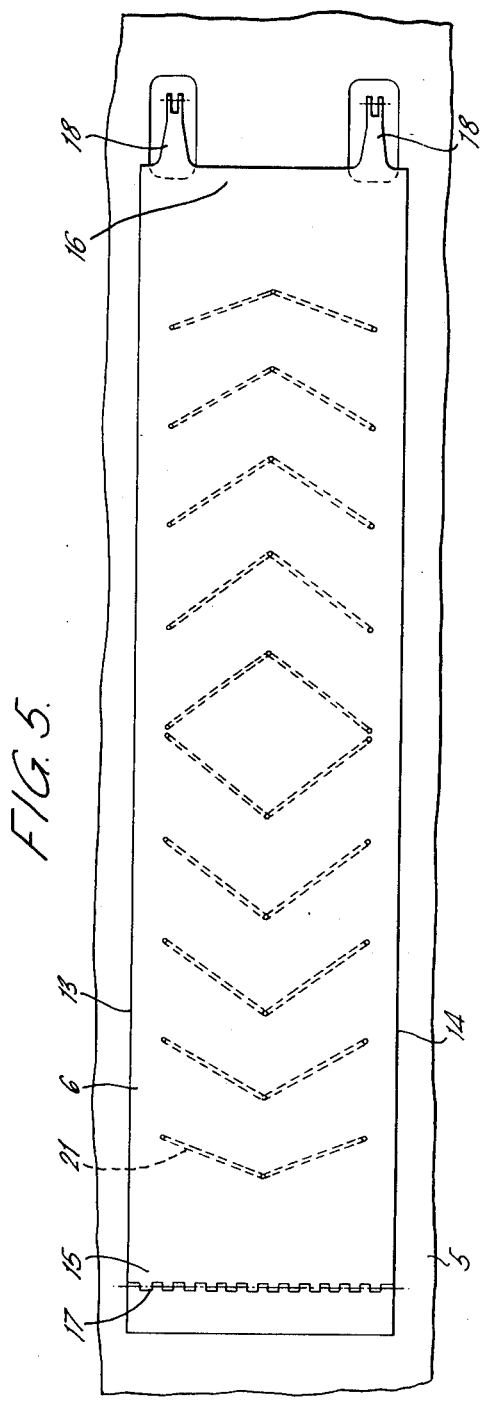
Figure 6:
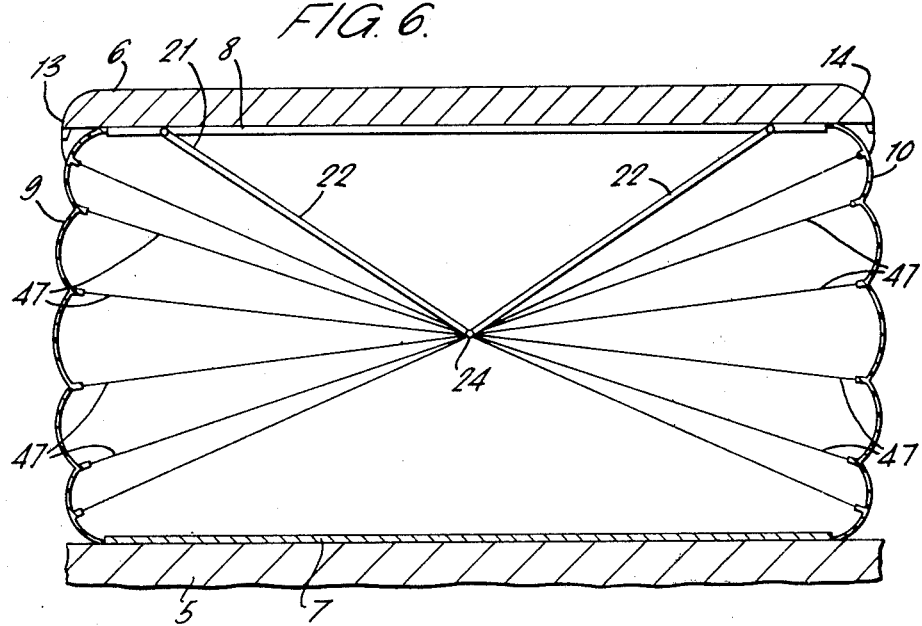
Figure 7:
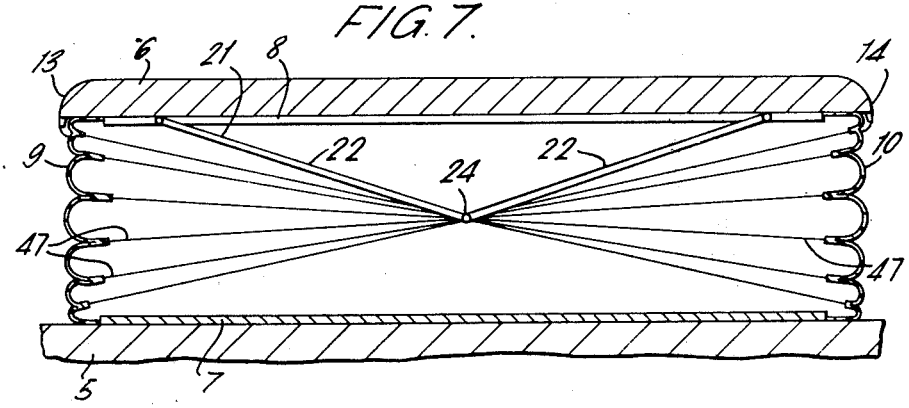
Figure 8:
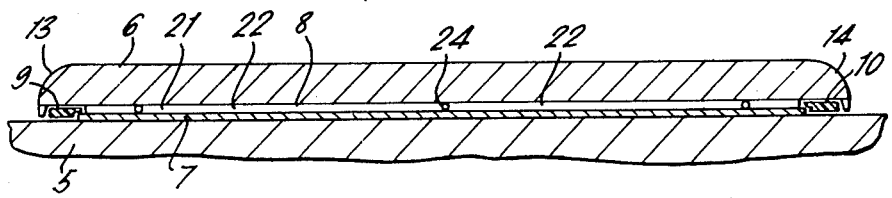
Figure 9:
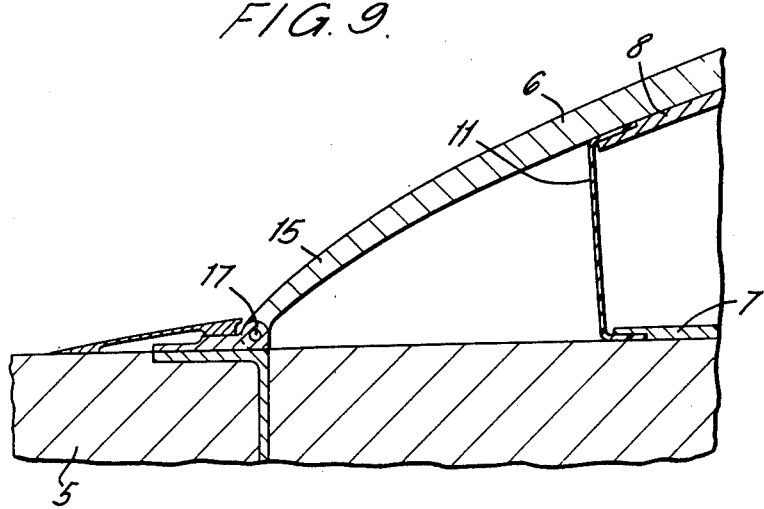
Figure 11:
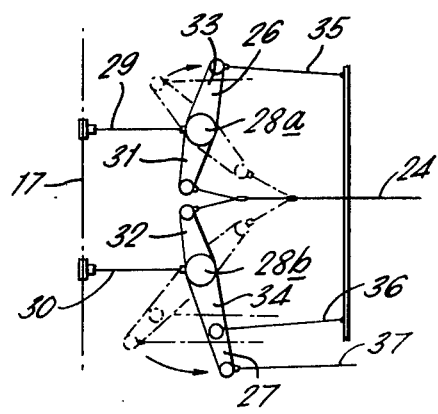
Figure 12:
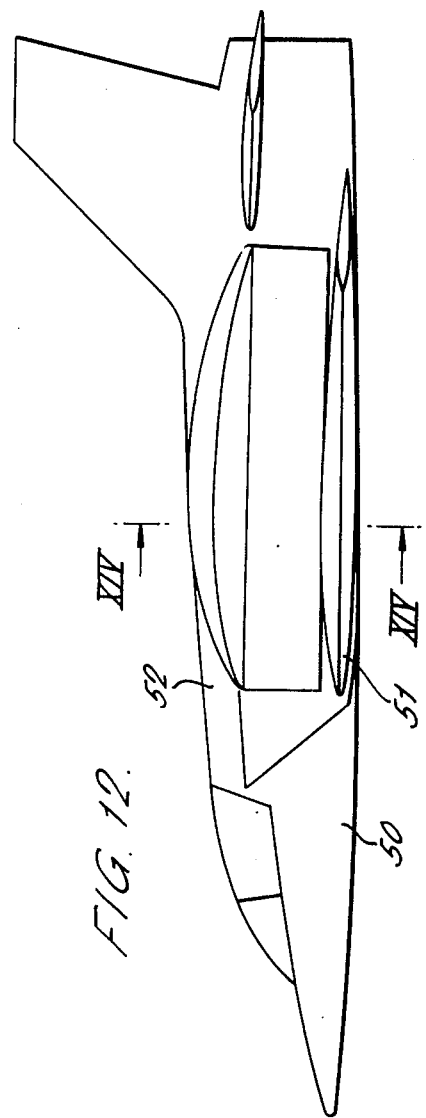
Figure 13:
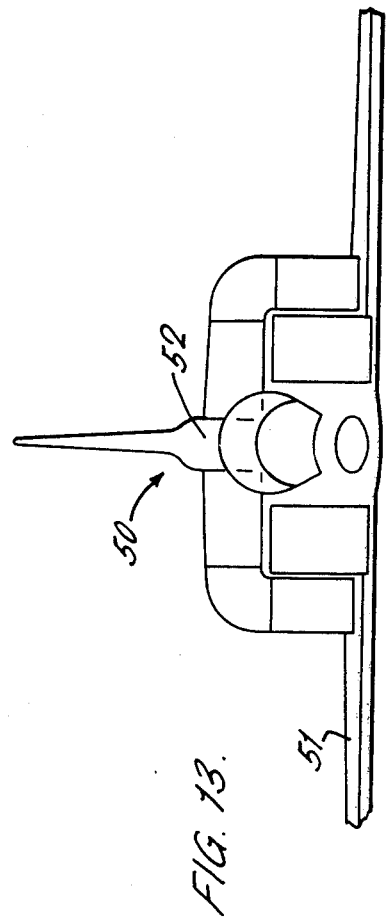
Figure 14:
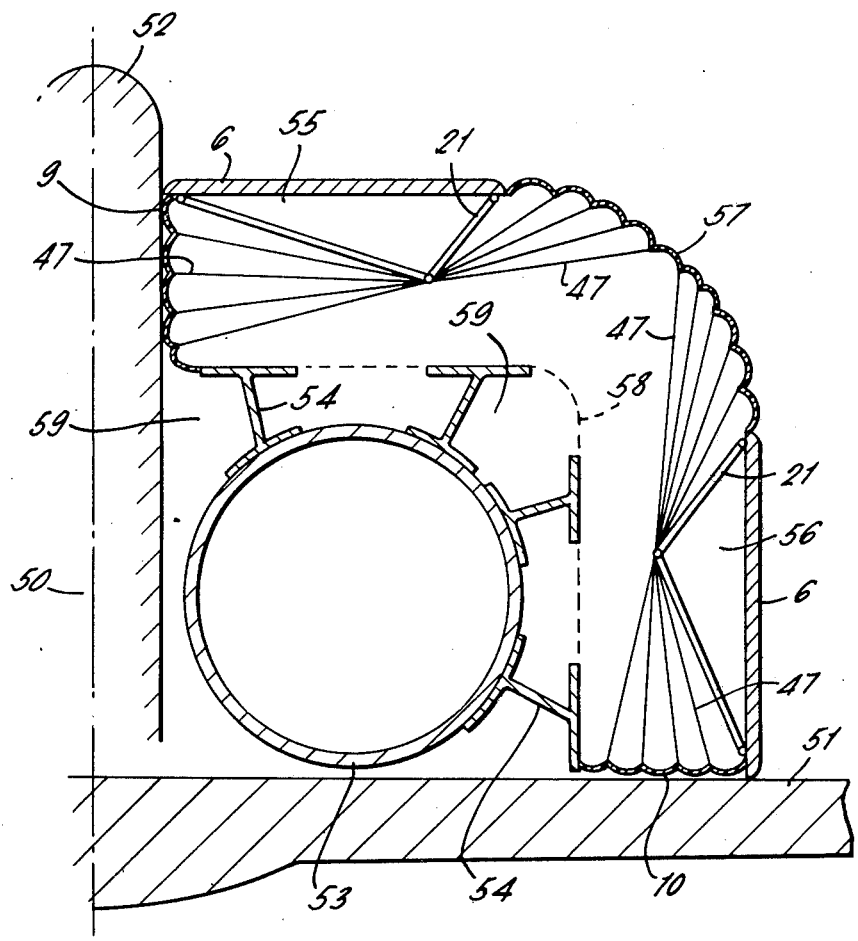

FIG. 4 is a similar view to that of FIG. 3 but with fuel storage means in a collapsed condition, FIG. 5 is a plan view of the fuel storage means in a collapsed condition, FIG. 6 is a cross-sectional view taken on line VI—VI of FIG. 3, i.e. with the fuel storage means in an expanded condition, FIG. 7 is a similar cross-sectional view to that of FIG. 6 but with the fuel storage means in a partly expanded condition, FIG. 8 is a further similar cross-sectional view but with the fuel storage means in a collapsed condition, FIG. 9 is an enlarged view of the area included in block IX of FIG. 3, FIG. 10 is a further plan view of the fuel storage means but with the upper region partly cut away to show further internal mechanism, FIG. 11 is an enlarged view of the area included in block XI of FIG. 10, FIG. 12 is a side view of a low winged aircraft with an alternative arrangement of fuel storage means, FIG. 13 is a front view of the aircraft of FIG. 12, and FIG. 14 is a cross-sectional view taken on line XIV—XIV of FIG. 12, only that side to the right of the aircraft centre line when viewed from the front being illustrated.

Referring to FIGS. 1–11, an aircraft has a fuselage 1 and wings 2. On the exterior surface of the aircraft are mounted expandable fuel tanks 3 to provide storage for fuel extra to that carriable in the internal tanks of the aircraft. The tanks 3 are arranged to expand as they are filled with fuel, and to contract as they become emptied. In this way the presence of the empty tanks causes only a small drag increase over a similar aircraft without such tanks.

FIGS. 3 to 11 illustrate one typical tank 3 in detail. The tank 3 includes a fuel-containing cell 4, which lies exteriorly of a surface skin member 5 of the aircraft, and a deformable external wall panel 6 which lies exteriorly of the fuel-containing cell 4. The fuel-containing cell 4 itself comprises a rectangular base panel 7 which lies closely adjacent the surface skin 5, and a rectangular outer panel 8, which lies closely adjacent the external wall panel 6, the panels 7 and 8 being joined to form a fuel tight enclosure by side membranes 9 and 10 of plastics reinforced woven material, and by end membranes 11 and 12 of similar material.

The deformable external wall member 6 is of rectangular form with two side edges 13 and 14 which are free, and two end edges 15 and 16 which are connected to the aircraft surface skin member 5. The wall member 6 is formed of inner and outer skins of fiber reinforced plastics construction between which lies a core of honeycomb material, the arrangement of components during build being such that it acts inherently as a leaf spring member always tending to maintain a generally flat condition lying close to the skin member 5 in use. The wall member 6 is attached at its edge 15, its leading edge, to the skin member 5 by means of a simple hinge assembly 17 extending the width of the wall panel 6. It is attached at its edge 16, its trailing edge, to the skin member 5 by means of two spaced translatory joint assemblies 18 which allow the wall panel 6 to pivot and also allow its leading and trailing edges 15 and 16 to move relatively as the intermediate region between becomes bowed or flattened.

In an alternative arrangement, not shown, translatory joint assemblies 18 are used at the leading edge instead of the simple hinge assembly.

Each translatory joint assembly 18 comprises a crank arm 19 pivoted about a fixed transverse axis 20 to the skin member 5 and, at its swinging end, to the trailing edge 16 of the wall panel 6.

The fuel-containing cell 4 further includes means to both prevent the side membranes 9 and 10 from displacing outwards away from the interior of the tank due to fuel inertia or external aerodynamic forces when the tank is expanded, and to constrain the said side membranes to fold inwards as the tank is collapsed. The means includes a series of V-shaped frame members 21 hinged by the arms 22 of the V-shape to the outer panel 8 about a series of spaced transverse axes. As shown particularly in FIG. 10, those in the forward part of the fuel-containing cell have their apices 23 connected by a cable 24 extending forwards through the end membrane 11 whilst those lying the rear of the fuel-containing cell have their apices 23 connected by a cable 25 extending rearwards through the end membrane 12.

The cable 24 connects to a mechanism shown in block XI of FIG. 10 and illustrated in larger scale in FIG. 11. The mechanism includes a pair of levers 26, 27, respectively, each arranged to swing about an intermediate region 28a and 28b respectively of their length and connected at those regions 28a and b to tension cables 29, 30, respectively, which extend to and are anchored at the region of the hinge 17. One arm 31, 32, respectively, of each lever is connected jointly to the cable 24 and a further arm 33, 34, respectively is connected by a cable 35, 36, respectively, to the forward end of the rectangular base panel 7. That arm 34 of the lever 27 is connected by a cable 37 which extends rearward through the fuel-containing cell 4 to the rear edge 16 of the wall panel 6 at 38. By this arrangement movement of the rear edge 16 away from the front edge 15 as the tank collapses causes the pair of levers 26, 27 to swing about their respective intermediate regions 28a and 28b and thereby to draw the apices 23 of the V-shaped members 21 forwards.

Those V-shaped frame members 21 in the rearward part of the fuel-containing cell have their apices 23 connected by the cable 25 to one end 40 of a lever 41. The lever 41 has a further end 42 pivoted to the aircraft skin member 5 and is connected at an intermediate point 43 by a further cable 44 to the rear end of the wall panel 6. Again, this arrangement causes the apices of those rear-mounted V-shaped members 21 to be drawn rearwardly as the tank collapses.

Spaced cables 45 and 46 connect the rear edge of the base panel 7 to the crank arm 19. Their purpose, and that of the cables 35 and 36 connected to the forward edge of the base panel 7 is to maintain the position of the fuel-containing cell within pre-determined limits with reference to the wall panel 6 irrespective of the condition of the tank.

The described arrangement whereby the apices of the V-shaped members 21 are moved as the tank is collapsed has the effect of drawings regions of the side membranes 9 and 10 generally inwards so that as collapse occurs the side membranes fold neatly within the rectangular plan form of the tank. To this effect, the apices 23 each have a plurality of cables 47 connected thereto and to regions of the side membranes 9 and 10 as shown in FIG. 6. The cables 47 act as ties.

Fuel is admitted and withdrawn from the tank through a pipe 48 extending through the base panel 7; admission of the fuel under pressure causing the collapsed tank 3 to expand against the inherent bias of the external wall panel 6. As the fuel is used or passed to other tanks during flight the said inherent bias causes the tank to collapse and the external wall panel 6 to lie closely adjacent the skin member 5.

Although, in the preceding Figures the tank is shown with a discrete fuel-containing cell 4 having a base panel 7 and an outer panel 8, one or both of these may be omitted and the fuel-containing membranes attached directly to the skin member 5 and the external wall panel 6. If the outer panel 8 was omitted, the V-shaped frames 21 would be connected directly to the wall panel 6 and if the base panel 7 was omitted the cables 35, 36 and 45, 46 would be deleted.

FIGS. 12, 13, and 14 illustrate an alternative embodiment of a fuel storage means. In this case the skin member 5 of the aircraft is not present and the tanks 3 form expandable portions of the existing internal tankage of the aircraft.

In these Figures an aircraft has a fuselage 50 and a low-mounted wing 51. A spin 52 extends along the top of the fuselage. To each side of this spine 52 lies a tubular casing 53 (only one is shown in FIG. 14) which houses an engine and its associated ducting. Carried by stiffeners, shown diagrammatically at 54, are two expandable fuel containing units 55 and 56. These units are each basically similar to the tank 3 previously described with the exception that the base panel 7 is not provided and the side membranes 9 and 10 of adjacent sides are conveniently joined to provide a single shared membrane 57. The fuselage contour is shown in broken outline at 58; with the tank units 55 and 56 collapsed their respective wall panels 6 lie closely adjacent this line, the membrane 57 being drawn in by the ties 47 connected to the frame members 21 to follow said contour. The side membranes 9 and 10 are drawn in similarly to those illustrated in FIGS. 1–11. The outer panel 8 may or may not be provided in this embodiment; it is a matter of design choice.

In this way fuel can be stored both in the fixed fuselage regions sown at 59 surrounding the duct 53, and, if desired, in the tank units 55 and 56 when expanded beyond the normal fuselage contour.

As before stated the units 55 and 56 are similar in all major respects to the tank 3 described with reference to FIGS. 1 to 11 despite the fact that they function as expandable extensions to an existing fuselage fuel tank.

I claim:

1. An aircraft having a surface region, a fuel storage means expandable to a position in which it is at least partially external to the surface region, the fuel storage means including a deformable exterior wall panel in the form of a leaf spring member having two opposite end regions with an intermediate region between, anchorage means for anchoring only the two opposite end regions of said panel to spaced regions of the aircraft surface region, the said intermediate region being free of such anchorage means, translatory means included in at least that anchorage means at one of the said end regions to allow that end region to move toward said other end region when the intermediate region between said end regions of the wall panel is bowed outwards from a position close to the surface region to lie proud of said surface region, the said wall panel being inherently biased toward that position in which its intermediate region lies close to the said surface region.

2. An aircraft according to claim 1, wherein the fuel storage means includes flexible side-wall membranes sealing the region between the deformable wall panel and the surface region of the aircraft, constraining means inside the fuel storage means to constrain the membranes from excessive outward bulging, the constraining means including a series of foldable frames and a plurality of cable or cable-like members connected to said foldable frames and to said membranes.

3. An aircraft according to claim 2 in which the frames are V-shaped with the arms of the V-shape pivoted to fold at or near the deformable wall panel and the apices of the V-shape protruding into the interior of the fuel storage means, the cable or cable-like members being connected to the apices.

4. An aircraft according to claim 3 wherein the frames are folded by means of cables or cable like members extending lengthwise of the fuel storage means.

5. An aircraft having a surface region, a fuel storage means expandable to a position in which it is at least partially external to the surface region, the fuel storage means including a deformable exterior wall panel having two opposite end regions with an intermediate region between, anchorage means for anchoring the two opposite end regions of said panel to spaced regions of the aircraft surface region, translatory means included in at least that anchorage means at one of said end regions to allow that end region to move toward said other end region when the intermediate region between said end regions of the wall panel is bowed outwards from a position close to the surface region to lie proud of said surface; the fuel storage means including flexible side-wall membranes sealing the region between the deformable wall panel and the surface region of the aircraft; the membranes being constrained from excessive outward bulging by constraining means inside the fuel storage means; the constraining means including a series of foldable frames and a plurality of cable or cable-like members connected to said foldable frames and to the said membranes.

6. An aircraft according to claim 5 wherein the deformable exterior wall panel is biased toward that position in which its intermediate region lies close to the surface region.

7. An aircraft according to claim 5 wherein the translatory means comprises a rotatable crank.

8. An aircraft according to claim 5 having only one anchorage including a translatory means, wherein said other anchorage comprises a simple hinged joint.

9. An aircraft according to claim 5 in which the frames are V-shaped with the arms of the V-shape pivoted to fold at or near the deformable wall panel and the apices of the V-shape protruding into the interior of the fuel storage means, the cable or cable-like members being connected to the apices.

10. An aircraft according to claim 9, wherein the frames are folded by means of cables or cable-like members extending lengthwise of the fuel storage means.

* * * * *